Dec. 28, 1965   K. A. O. HEINZE ETAL   3,226,549
MEASURING DEVICE FOR THE DISCONTINUOUS MEASUREMENT
OF THE THICKNESS OF PREFERABLY SMALL
WORK-PIECES BY MEANS OF β-RAYS
Filed Oct. 28, 1960   2 Sheets-Sheet 1

INVENTORS
KARL A. O. HEINZE
GERT F. H. BIERKARRE
BY
Frank R. Trifari
AGENT

Dec. 28, 1965 K. A. O. HEINZE ETAL 3,226,549
MEASURING DEVICE FOR THE DISCONTINUOUS MEASUREMENT
OF THE THICKNESS OF PREFERABLY SMALL
WORK-PIECES BY MEANS OF β-RAYS
Filed Oct. 28, 1960 2 Sheets-Sheet 2
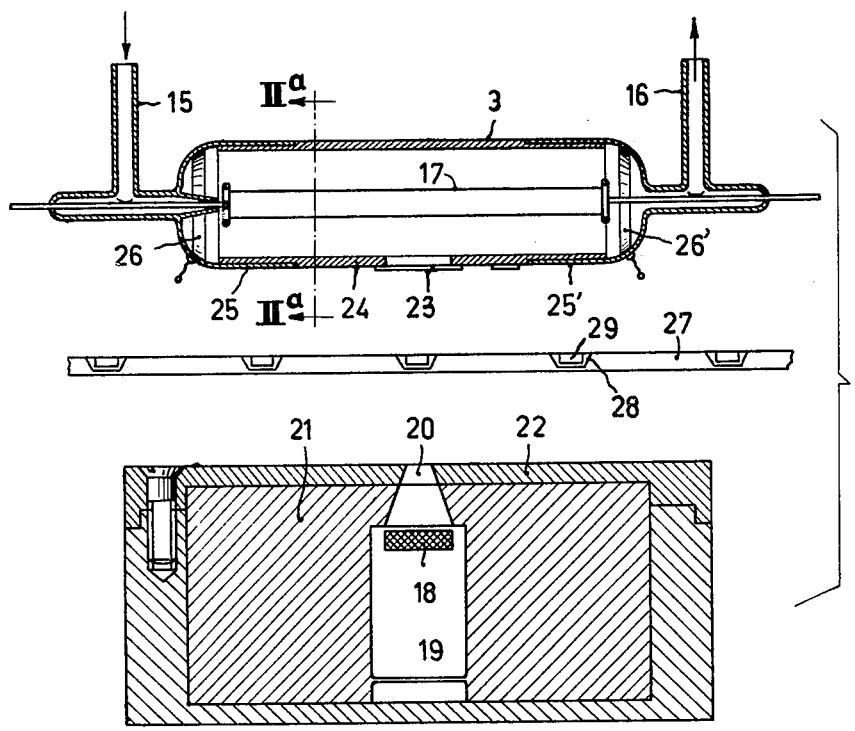
FIG. 2
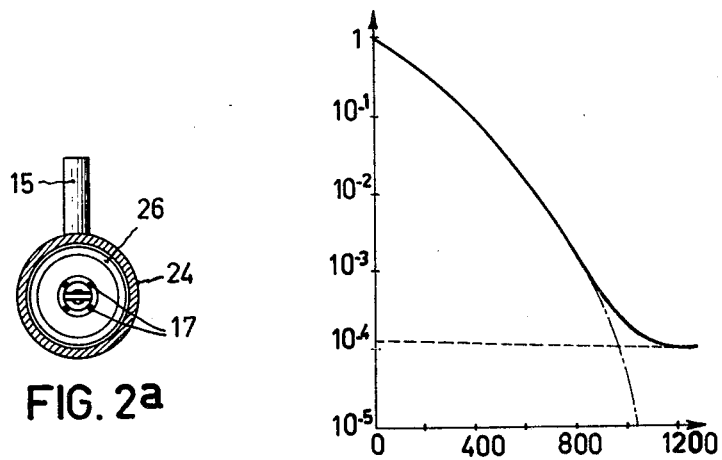
FIG. 2a
FIG. 3
INVENTORS
KARL A. O. HEINZE
GERT F. H. BIERKARRE
BY
Frank R. Trifan
AGENT United States Patent Office 3,226,549
Patented Dec. 28, 1965

3,226,549
MEASURING DEVICE FOR THE DISCONTINUOUS MEASUREMENT OF THE THICKNESS OF PREFERABLY SMALL WORK-PIECES BY MEANS OF β-RAYS
Karl Alexander Otto Heinze, Hamburg-Niendorf, and Gert Franz Heinz Bierkarre, Hamburg-Bergedorf, Germany, assignors to North American Philips Company, Inc., New York, N.Y., a corporation of Delaware
Filed Oct. 28, 1960, Ser. No. 65,640
Claims priority, application Germany, Nov. 26, 1959, P 23,960
5 Claims. (Cl. 250—83.6)

The invention relates to a device for measuring the thickness of relatively small discrete articles, using β-rays.

It is known to measure the thickness of given materials by the absorption of rays which pass through such materials. For comparatively thin materials having a mass density up to about 1,400 mg./cm.$^2$, use is preferably made of the absorption of β-rays. The presence of β-radiation may be determined with several measuring devices, for example with an ionization chamber, Geiger-Muller tube, proportional counter tube or scintillation counter.

These techniques are more or less suitable for continuous measurement, for example of thickness of long bands. In the discontinuous measurement of individual work-pieces a difficulty arises due to the time-constant of the measuring device. The errors resulting therefrom are greater, the shorter the measuring time available, which is the case more especially for large batches. On the other hand, a high accuracy of measurement is frequently also desired for large batches, for example in measuring the thickness of semi-conductive crystals that are to be converted into transistors.

It is known these difficulties can be avoided, at least in part, by making use of the negative back-coupling principle, resulting in the time constant of the measuring equipment being reduced. However, such improvement obtained by switching steps is still insufficient in many cases.

Both in the case of the proportional counter tube and the scintillation counter, the integrated output current is highly dependent upon the operating voltage applied. It is known per se to avoid this disadvantage by measuring the difference between the output currents of two counters which are loaded by the radiation to be measured and a reference radiation, respectively, and which are operated from one voltage source. Such a method is not particularly suitable for scintillation counters, since their current-voltage characteristics show great individual fluctuations.

It is also known that proportional counters may be operated with gas fillings of different kinds. In order to obtain short measuring times, the gas-amplification must be as high as possible, which is achieved by using organic gases or vapors (either pure or as an addition to rare gases), especially methane, $CH_4$. However, the use of such gas or similar gases makes it necessary for the filling gas, which is deteriorated by the discharges, to be continuously replaced so that the proportional counting tube is operated as a socalled flow-counter.

It has been found that with the strong loads necessary because of the requirements (short measuring time with high accuracy), for example with methane $CH_4$-counters, the zero-point and the calibration depend to a considerable extent upon the rate of flow of the methane and the value of the load. The variation in the composition of the gas near the counting wire has been found to be responsible for this.

The present invention relates to a measuring device for the discontinuous measurement of the thickness of small work-pieces of preferably small thickness with the aid of β-rays, the difference in absorption measured by a measuring counting tube and a reference counting tube indicating the measured value. The invention is characterized in that two proportional flow-counter tubes are operated from the same voltage source which counter tubes having gas-flow resistances differing by less than 20% are fed in parallel from the same gas-source and each of the tubes comprises two or more counting wires arranged inside the sensitive volume in such a manner that the volume is independent of the number of the counting wires.

It is known to provide counters with more than one counting wire in order to increase preferably the sensitive volume. However, in the present invention, this principle is modified in that two or more counting wires are arranged inside a sensitive volume so that the latter is independent of the number of the counting wires. With unchanged total current, this results in a decreased current per unit length of the counting wires and hence in a decreased variation of the active gas.

The novel thickness-measuring device operates with particular results if the two counting tubes (measuring counting tube and reference counting tube) are traversed by a gas, preferably methane of the same degree of purity and the same rate of flow. Equalized rates of flow by feeding the two counters in parallel from the same source of gas, may be obtained by capillaries .

Further improvement is possible in obtaining results which are reproducible with a high degree of accuracy and therefore the load on the measuring counter can be temporarily maintained approximately constant. This may be achieved by using a conveyer belt for the mechanical transport of the work-pieces to be measured, which conveyer belt is provided with recesses to receive the work-pieces and has a mass density approximately equal to that of the work-pieces (deviation less than 20%).

The invention will now be described with reference to the accompanying drawings showing one embodiment, by means of which Ge-crystals having a thickness of from 100 to 500$\mu$ and a surface area down to 0.02 cm.$^2$ can be measured with an accuracy of at least about 1$\mu$ within the shortest possible measuring time.

FIGURE 2 shows a longitudinal section of a counter tube and the opposing preparation chamber, together with the interposed conveyer belt.

FIGURE 2a shows a cross-section of a counter tube, and

FIGURE 3 shows an absorption curve of the β-rays.

Figure 1:
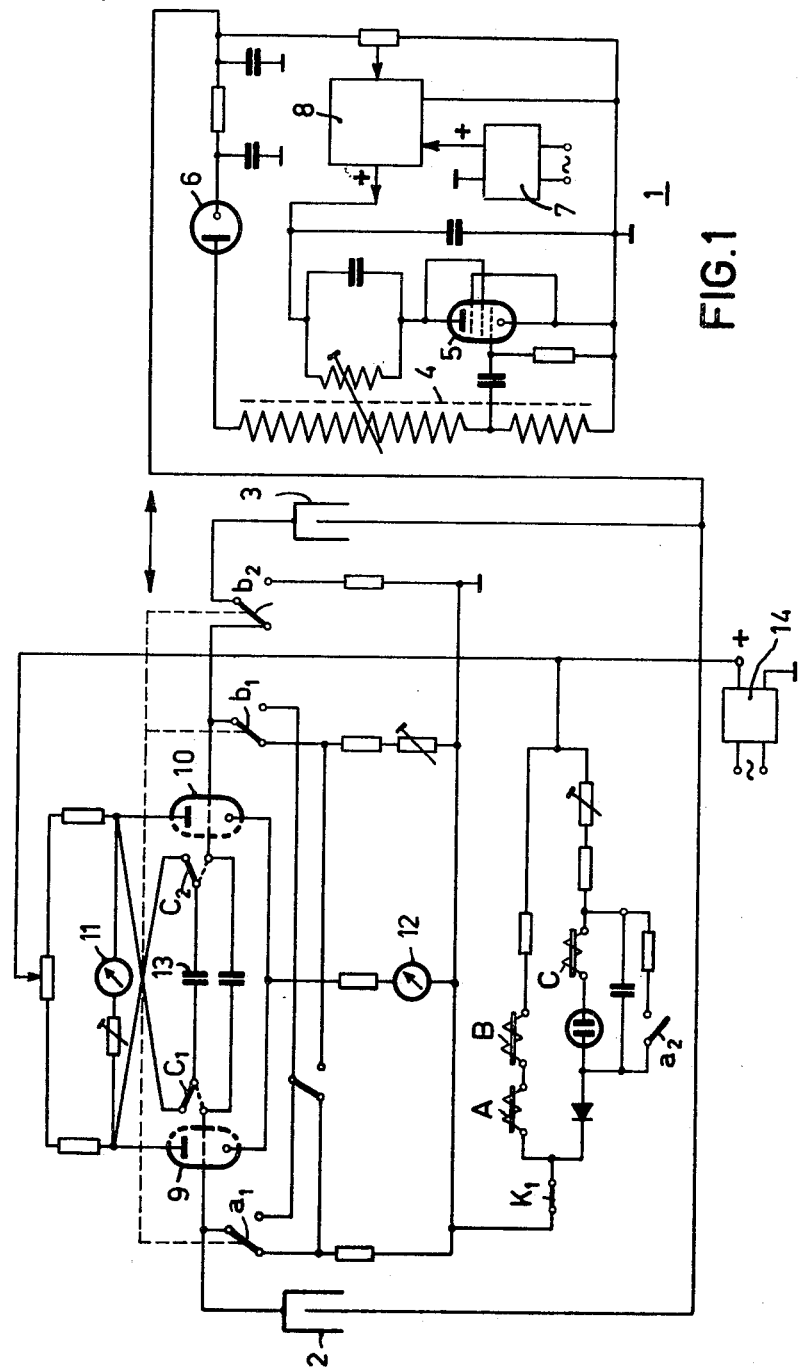
FIGURE 1 shows the electronic measuring part.

For better understading of the operation of the measuring equipment, it is advisable first to mention some details about the physical principles. If electrons of high energy are driven into a crystal lattice, they enter into interaction with the atomic nuclei and the electrons of the crystal. Because of the comparatively large mass of nuclei relative to the mass of electrons, in the case of an impact with an atomic nucleus, a small amout of energy only is given off in the form of translation energy, but on the other hand large deflection angles and moreover continuous radiation ($EV=hv$) occur. This may give rise to electrons driven into the crystal leaving it at the same area at which they have entered (so-called back scattering). In contrast thereto, in the case of an impact with an electron of the crystal, a comparatively large amount of energy may be given off with a small deflection angle. Since the number of electrons in the crystal is higher than the number of nuclei by a factor Z ($Z$=nuclear-charge number), the energy of incident electrons is evidently distributed over the crystal lattice substantially by the interaction with the electrons of the crystal. Substantially similar conditions are found for the passage of electrons of high energy through gases and liquids. From the conditions described it follows that the number of the electrons passed decreases with increasing thickness of the crystal. In addition, this absorption is approximately independent of the chemical character of the substance and is primarily influenced by the mass-density (gms./cm.²) which is traversed by the electrons. Consequently, a thickness measurement by means of electron absorption is almost dependent only upon the density of the substance, which means, for example in the case of germanium, that the measured result is not varied by the activation.

The β-rays emanating from a radio-active preparation have no uniform energy, but all possible energies between zero and a maximum value. The form of the energy spectrum is determined by the quantum condition of the parent nucleus and the daughter nucleus, as well as by the simultaneous emission of a neutrino.

The energy distribution of the β-rays and the absorption lead to an absorption curve as shown in FIGURE 3. The curve in full line shows the variation actually measured, the dashed line shows the background always available (zero-effect, continuous radiation) and the dot-and-dash line shows the share of the β-radiation with a high absorption, aluminum having been used as the absorber.

The intensity determined shows an approximately exponential variation over a considerable proportion of the curve. It may also be deduced which radioactive isotope yields the maximum variation in intensity for a predetermined thickness and density of the preparation. The variation in intensity with thickness is a maximum if an isotope is chosen so that its radiation through the object to be measured is attenuated by a factor $1/e$. A radiator which is most suitable for this purpose is $Sr^{90}$. The dates for this isotope are:

$$Sr^{90} \xrightarrow[\beta(E_{max.}=0.61 \text{ mev.})]{\tau=19.9a} Y^{90} \xrightarrow[\beta(E_{max.}=2.2 \text{ mev.})]{\tau=61h} Zr^{90}$$

where $\tau$ means the half-value period, $a$ indicates years and $h$ indicates hours. For the measurement use is made especially of the radiation $Y^{90}$ which is rich in energy, while due to the very long half-value period of the $Sr^{90}$ (about 20 years) continuous subsequent calibration of the equipment due to decreasing intensity may be avoided.

The electronic measuring part comprises, as shown in FIGURE 1, a high-voltage generating device 1 for a reference counter tube 2 and a measuring counter tube 3, which, as will be explained hereinafter, are proportional flow-counter tubes. The high tension is produced by the high-frequency oscillator comprising a three-winding transformer 4 and a tube 5, the output of which is rectified by a diode 6. The anode voltage for tube 5, which is delivered by a rectifier 7, is controlled by a control circuit 8 in the usual manner. This control circuit may thus also adjust the value of the high tension.

A measuring instrument 11 is the indicating instrument proper for the thickness to be measured, whereas a meter 12 serves to indicate the mean current of the tube which is adjustable by the control of the high voltage. There is also provided a relay arrangement comprising relays A, B, C, which is operated by a switching contact $K_1$. As soon as the relays A, B are energized, the contacts $a1$, $a2$ and $b1$, $b2$ occupy the positions shown, that is to say the grid of each of the tubes 9 and 10 is connected to the counting tubes 2 and 3 respectively. After an adjustable delay time, a capacitor 13 is connected through contacts $c1$, $c2$ of the relay C for damping purposes, so that a steady indication is obtained. After switching contact $K_1$ has been opened, the comparatively large capacitor connected in parallel with the relay C may be discharged by means of contact $a2$ through the resistor connected parallel to the capacitor, in order to avoid undesirable response of the relay.

If the contacts $a1$, $b1$, $b2$ occupy the other positions both grids of the tubes 9 and 10 are connected to the reference counter tube 2 and the mean current may then be adjusted. The operating voltage for the difference amplifier is derived from a rectifier device 14.

Counter tubes which are most suitable for the purpose of the invention are counters with a filling of methane because of their high gas-amplification. However, the filling gas is deteriorated by the continuous discharges, so that the gas must be continuously replaced. The gas of normal degree of purity (which can be supplied by industry from a steel flask) is reduced to a pressure only slightly above atmospheric pressure by means of two reducing valves and introduced into the counter tube at a nozzle 15 as shown in FIGURE 2. The gas slowly traverses the two counter tubes 2 and 3, connected in parallel. The gas emerging from the counters at 16 finds its way through capillary tubes to a flow indicator filled with apiezon oil. The amount of the gas flow, only a few cm.³/min., may thus easily be maintained constant. These two capillary tubes must be chosen so that the two counters have the same gas-flow resistance. The measuring point thus becomes more reproducible when the amount of gas flow is varied.

The physical reason for the effect that the rate of flow of the gas influences the gas-amplification resides in the variation of the composition of the gas near the counting wire as a result of the discharges. Consequently, the counters used are of a special type containing four counting wires 17.

Since crystals having a surface area of about 2 mm.² are to be measured, the source of radiation itself must be substantially punctiform. The preparation 18 proper, which is wholly set in metal, together with its carrier 19 is surrounded by a holder having a conical diaphragm 20. A lead protector 21 is necessary for safety reasons, in order to reduce the intensity of the unavoidable continuous radiation. With the conical bore of the diaphragm 20, the preparation is used to the maximum extent of about 2.5% of the total intensity at the aperture of the diaphragm, the absorption and reflection in the preparation not being taken into account. A further attenuation by roughly a factor 3 is produced by a Ge-crystal of, for example, 150μ thick.

The β-radiation enters the counters through windows 23 which are covered with mica foils having a thickness of about 5 to 50 mg./cm.². The foils are internally provided by evaporation with nickel in order that by sufficient conductivity interfering charges are avoided. The cylinder 24 of the counter tube is nickel-plated by electrolysis to ensure a small sensitivity to light and reduced subsequent discharges. The material of the counting wires 17 is comparatively unimportant, molybdenum wire being used in the instant case. Glass calottes 25 provided with grounded protective rings 26, 26′ of aquadag in order to prevent leakage currents from the counting wires to the cathode, close the counting tubes 2 and 3 respectively.

A conveyor belt 27 may be led between the diaphragm 20 of the radio-active preparation 18 and a window 23 of the counting tube 3 and be provided with recesses 28 for small work-pieces 29 to be measured, so that the mass density of the conveyor belt substantially corresponds to that of the work-pieces. Thus, the load on the measuring counter tube is temporarily kept substantially constant. The work-pieces or crystals may be put in automatically or by hand, for example with the aid of a siphon.

For calibration use may be made, for example, of crystals having a thickness of 150μ, which were measured with a precision measuring-clock. The indication is, to a first approximation, proportional to the difference in thickness. This is based on the fact that an exponential function is closely approximated by a linear function for small arguments. The full deflection of the measuring instrument 11 may be adjusted, for example, for a deviation of about 6μ from the nominal value. If 300μ is chosen as the nominal value and the reference counter tube 2 and the high tension 1 are readjusted to obtain the initial current of the tube, the calibration has also substantially not changed. The reference counter tube 2 may be influenced with a radiation which likewise passes through a work-piece, or which is determined in each case by means of an adjustable absorber.

The comparatively high accuracy of the measuring process is obtainable without great attendance of the device and the measuring time is very short. The device can serve for many uses. Thus, for example, the etching process in the manufacture of transistors may be controlled if subdivided into a plurality of stages while carrying out measurements between the individual etchings.

What is claimed is:

1. A thickness measuring device for discontinuous measurement of articles of relatively small thickness comprising a source of β-rays, β-ray detection means for obtaining a differential output indicative of the thickness of an article, and means to interpose articles to be measured successively between said β-ray source and said β-ray detection means, said β-ray detection means including a first proportional gas flow-counter tube adapted to produce a reference signal in response to β-radiation of given intensity, a second proportional gas flow counter positioned to produce a signal proportional to β-radiation traversing one of said articles, said first and second counters having gas flow resistances which differ by less than 20%, means to energize both said counters from a common source of potential, and means to introduce a gas having the same composition and rate of flow into both said counters, said counters each having a plurality of conductors positioned within a sensitive volume thereof whereby the volume is independent of the number of conductors.

2. A thickness measuring device for discontinuous measurement of articles of relatively small thickness comprising a source of β-rays, β-ray detection means for obtaining a differential output indicative of the thickness of an article, and means to interpose articles to be measured successively between said β-ray source and said β-ray detection means, said β-ray detection means including a first proportional gas flow-counter tube adapted to produce a reference signal in response to β-radiation of given intensity, a second proportional gas flow counter positioned to produce a signal proportional to β-radiation traversing one of said articles, means to energize both said counters from a common source of potential, a common gas source for both said counters, and capillary means connecting each of said counters in parallel to said common gas source whereby a gas of the same composition flows into both counters and the gas flows of both said counters differ by less than 20%, said counters each having a plurality of conductors positioned within a sensitive volume thereof whereby the volume is independent of the number of conductors.

3. A thickness measuring device for discontinuous measurement of articles of relatively small thickness comprising a source of β-rays, β-ray detection means for obtaining a differential output indicative of the thickness of an article, and conveyor means to transport and interpose articles to be measured successively between said β-ray source and said β-ray detection means, said conveyor means including a movable support provided with recesses to receive the articles, said moveable support having a mass density approximately equal to that of the articles, said β-ray detection means including a first proportional gas flow-counter tube adapted to produce a reference signal in response to β-radiation of given intensity, a second proportional gas flow counter positioned to produce a signal proportion to β-radiation traversing one of said articles, said first and second counters having gas flow resistances which differ by less than 20%, means to energize both said counters from a common source of potential, and means to introduce a gas having the same composition and rate of flow into both said counters, said counters each having a plurality of conductors positioned within a sensitive volume thereof whereby the volume is independent of the number of conductors.

4. A thickness measuring device for discontinuous measurement of articles of relatively small thickness comprising a source of β-rays, β-ray detection means for obtaining a differential output indicative of the thickness of an article, and means to interpose articles to be measured successively between said β-ray source and said β-ray detection means, said β-ray detection means including a first proportional gas flow-counter tube adapted to produce a reference signal in response to β-radiation of given intensity, a second proportional gas flow-counter positioned to produce a signal proportional to β-radiation traversing one of said articles, said first and second counters having gas flow resistances which differ by less than 20%, means to energize said both counters from a common source of potential, and means to introduce methane gas of technical purity with the same rate of flow into both said counters, said counters each having a plurality of conductors positioned within a sensitive volume thereof whereby the volume is independent of the number of conductors.

5. A thickness measuring device for discontinuous measurement of articles of relatively small thickness comprising a source of β-rays, β-ray detection means for obtaining a differential output indicative of the thickness of an article, and means to interpose articles to be measured successively between said β-ray source and said β-ray detection means, said β-ray detection means including a first proportional gas flow-counter tube, a variable absorber of β-radiation interposed between said first counter and said β-ray source for producing from said counter a reference signal in response to the β-radiation, a second proportional gas flow-counter positioned to produce a signal proportional to β-radiation traversing one of said articles, said first and second counters having gas flow resistances which differ by less than 20%, means to energize both said counters from a common source of potential, and means to introduce a gas of the same composition and rate of flow into both said counters, said counters each having a plurality of conductors positioned within a sensitive volume thereof whereby the volume is independent of the number of conductors.

References Cited by the Examiner
UNITED STATES PATENTS

| | | | |
|---|---|---|---|
| 1,813,021 | 7/1931 | Brown | 250—52 |
| 2,397,075 | 3/1946 | Hare et al. | 250—83.6 |
| 2,472,153 | 6/1949 | Fearon | 250—83.6 |
| 2,599,922 | 6/1952 | Kanne | 250—83.6 |
| 2,641,710 | 6/1953 | Pompeo et al. | 250—83.6 |
| 2,951,159 | 8/1960 | Mariner | 250—83.3 |
| 2,968,729 | 1/1961 | Pepper et al. | 250—83.3 |
| 2,968,730 | 1/1961 | Morris et al. | 250—83.6 |

RALPH G. NILSON, *Primary Examiner.*
ARTHUR GAUSS, *Examiner.*